US00RE39373E

(19) United States
(12) Reissued Patent
Yudanov et al.

(10) Patent Number: US RE39,373 E
(45) Date of Reissued Patent: Nov. 7, 2006

(54) HYDRAULICALLY ACTUATED ELECTRONIC FUEL INJECTION SYSTEM

(75) Inventors: Sergi Yudanov, Frolunda (SE); William Richard Mitchell, deceased, late of Sylvania Waters (AU); by Cherriden Clair Mitchell, legal representative, Sylvania Waters (AU)

(73) Assignee: Enviro Diesel Systems Pty Limited (AU)

(21) Appl. No.: 09/628,944

(22) PCT Filed: Nov. 12, 1996

(86) PCT No.: PCT/AU95/00073

§ 371 (c)(1),
(2), (4) Date: Feb. 15, 1995

(87) PCT Pub. No.: WO95/21999

PCT Pub. Date: Aug. 17, 1995

Related U.S. Patent Documents

Reissue of:
(64) Patent No.: 5,785,021
Issued: Jul. 28, 1998
Appl. No.: 08/693,138
Filed: Nov. 12, 1996

(30) Foreign Application Priority Data

Feb. 15, 1994 (AU) ..... PM 3876
Dec. 21, 1994 (AU) ..... PN 0176

(51) Int. Cl.
*F02M 37/04* (2006.01)

(52) U.S. Cl. ..... 123/446; 123/676
(58) Field of Classification Search ..... 123/446, 123/676, 481, 198 D, 447
See application file for complete search history.

(56) References Cited

U.S. PATENT DOCUMENTS

| | | | | | |
|---|---|---|---|---|---|
| 4,543,930 | A | | 10/1985 | Baker | 123/300 |
| 4,545,345 | A | | 10/1985 | Pagdin | 123/299 |
| 4,612,898 | A | | 9/1986 | Steiger et al. | 123/299 |
| 4,722,310 | A | | 2/1988 | Igashira | 123/300 |
| 4,971,010 | A | * | 11/1990 | Iwata | 123/676 |
| 4,986,232 | A | * | 1/1991 | Richter et al. | 123/676 |
| 5,143,291 | A | * | 9/1992 | Grinsteiner | 239/88 |
| 5,325,834 | A | * | 7/1994 | Ballheimer et al. | 123/446 |
| 5,375,576 | A | * | 12/1994 | Ausman et al. | 123/446 |
| 5,413,076 | A | * | 5/1995 | Koenigswieser et al. | 123/446 |
| 5,651,345 | A | * | 7/1997 | Miller et al. | 123/446 |

FOREIGN PATENT DOCUMENTS

SU 1671938 * 8/1991

* cited by examiner

*Primary Examiner*—Carl S. Miller
(74) *Attorney, Agent, or Firm*—Gifford, Krass, Groh, Sprinkle, Anderson & Citlkowski, P.C.

(57) ABSTRACT

A hydraulically actuated electronically controlled unit injection system comprises a pressure intensifier associated with a hydraulically controlled differential valve (HDV) having a poppet valve opening into a working chamber of the pressure intensifier wherein there is a throttling slot between the poppet valve chamber and the working chamber with either at least a bypass channel between the poppet valve chamber and the working chamber or a bore connecting the working chamber to a control chamber of the HDV.

18 Claims, 8 Drawing Sheets

HYDRAULICALLY ACTUATED ELECTRONIC FUEL INJECTION SYSTEM

Matter enclosed in heavy brackets [ ] appears in the original patent but forms no part of this reissue specification; matter printed in italics indicates the additions made by reissue.

TECHNICAL FIELD

The present invention relates to a system of injecting fuel into compression ignition internal combustion engines and preferably provides a means of reducing noise emission from such engines.

BACKGROUND ART

Some fuel injection systems have been designed as unit injectors which incorporate an hydraulically driven pressure intensifier with a stepped plunger for injecting fuel into the engine's cylinder and the fuel delivery and timing are controlled by an electronically controlled valve, also the spray pattern is controlled by means of modulating the base fuel pressure supplied to the unit injector. The present invention is similar to these unit injectors but improvements are added which are described herein which increase the injection pressure, decrease the amount of hydraulic energy required to drive and control the fuel injection system, improve the stability of fuel delivery in consecutive injections, reduce the minimum fuel delivery, allow for control of an injection pressure curve of the unit injector and improve its reliability. The present invention preferably also provides a method of reducing the noise level emanating from the engine.

The present invention concerns hydraulically actuated electronically controlled unit injection (HEUI) systems which are well known to the addressee. The closest art known to the present invention is that of SU-A-1671938, the contents of which are incorporated herein by reference.

In a HEUI system, there is no cam for injection purposes and the fuel is supplied to the injectors under high pressure. The high pressure varies by means of a control signal from an engine management system and a top pressure may be 200 bars or around 3,000 psi and a bottom pressure could be 500 psi. The pressure is intensified within the injector. The fuel is then metered electronically and injected into the cylinder at pressures up to 27,000 psi or around 1800 bar.

The differences between the injector and injector system of the present invention and that of the Soviet specification mentioned above comprise firstly the inclusion of resilient means to bias an hydraulically controlled differential valve to its closed position; secondly, the inclusion of a throttling slot displaying the required characteristics. The Soviet specification reveals an hydraulic differential valve where the poppet end of that valve can close off the flow of fuel but in the present invention that part of the poppet and surrounds form a throttling slot with characteristics which alter the flow of fuel and alter the parameters under which the poppet will open or close. Specifically, the throttling slot provides a restriction such that the pressure in the poppet chamber is higher than the pressure in the working chamber in the injection part of the cycle and during the metering part of the cycle the throttling slot is designed to bring about a pressure difference which holds the HDV closed. The HDV in the Soviet design cannot carry out those functions due to the lack of a throttling slot and the lack of a by-pass channel between the control chamber and the poppet chamber.

DISCLOSURE OF INVENTION

In accordance with a first aspect of the present invention there is provided a fuel injector system for an internal combustion engine said injector system comprising an inlet port; a spill port; a pressure intensifier comprised of a piston forming a working chamber and a plunger forming a compression chamber; a nozzle with a needle, a spring biasing the needle to close the nozzle, and an outlet chamber connected to the compression chamber; a non-return valve the inlet of the non-return valve being connected to the inlet port and the outlet of the non-return valve being connected to the compression chamber; an hydraulically controlled differential valve (HDV) having a seating face located between the inlet port and the working chamber, said HDV forming a control chamber which opens towards the working chamber, said HDV using a poppet opening into the working chamber upon release from the seating face, said poppet forming a fluid flow throttling slot and a poppet chamber, wherein a flow area of the throttling slot is up to 99% less than the flow area between the HDV and the seating face during a part of travel of the HDV said part of travel being up to 80% of full travel of the HDV, further wherein said poppet chamber is connected to the control chamber via a bypass channel between the poppet chamber and the control chamber; resilient means for biasing the HDV towards its closed position; a solenoid valve installed between the control chamber and the spill port.

In a second aspect the present invention consists of a fuel injector system for an internal system combustion engine said injector system comprising an inlet port; a spill port; a pressure intensifier comprised of a piston forming a working chamber and a plunger forming a compression chamber; a nozzle with a needle, a spring biasing the needle to close the nozzle, and an outlet chamber connected to the compression chamber; a non-return valve the inlet of the non-return valve being connected to the inlet port and the outlet of the non-return valve being connected to the compression chamber; an hydraulically controlled differential valve (HDV) having a seating face located between the inlet port and the working chamber, said HDV forming a control chamber and the HDV opens towards the working chamber, said HDV using a poppet opening into the working chamber upon release from the seating face, said poppet forming a fluid flow throttling slot and a poppet chamber, wherein a flow area of the throttling slot is up to 99% less than the flow area between the HDV and the seating face during a part of the travel of the HDV, said part of the travel being up to 80% of full travel of the HDV, further wherein said working chamber is connected to the control chamber via a bore; resilient means for biasing the HDV towards its closed position; a solenoid valve installed between the control chamber and the spill port.

BRIEF DESCRIPTION OF DRAWINGS

The present invention will now be described by way of example with reference to the accompanying drawings, in which.

BEST MODES

Figure 1:
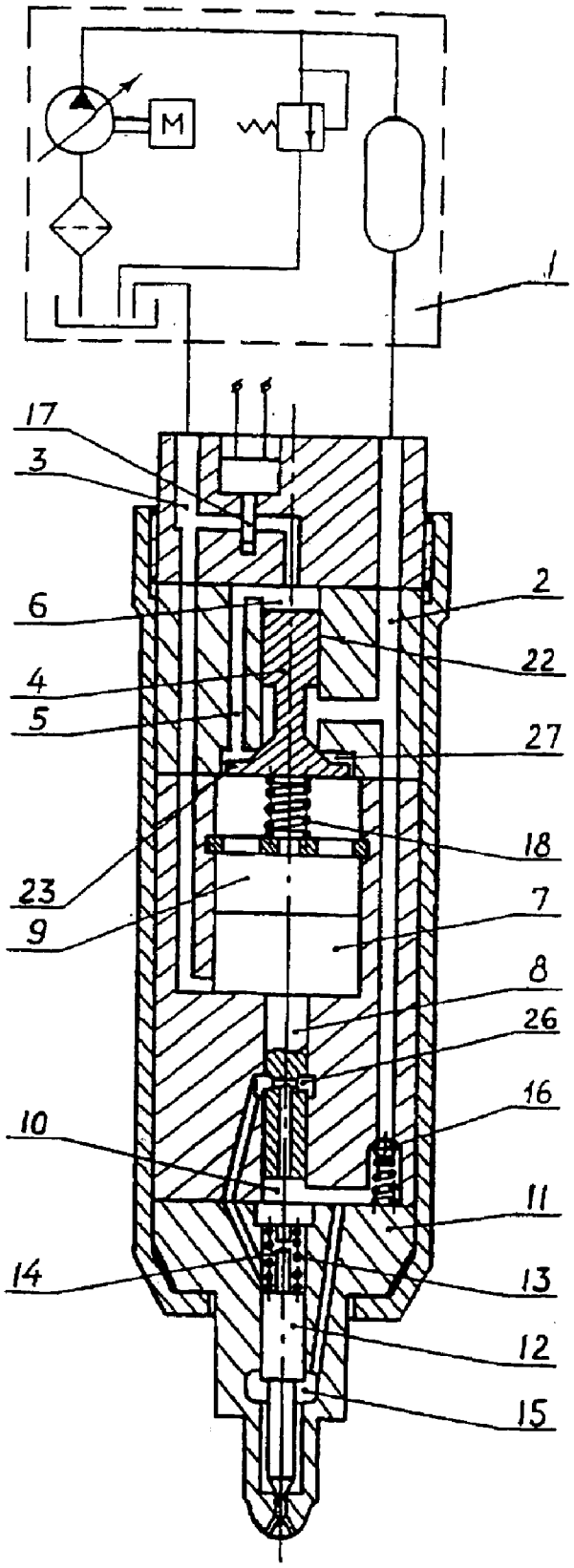
FIGS. 1 and 8 are longitudinal cross sectional views through an hydraulic unit fuel injector in accordance with a first embodiment of the present invention in different stages of operation.

The embodiment of FIG. 1 shows a source of fuel pressure 1, inlet port 2, spill port 3, hydraulically controlled differential valve (HDV) 4, control chamber 6, a pressure intensifier which is comprised of piston 7 and plunger 8, working chamber 9 and compression chamber 10, nozzle 11, needle 12, spring 13, locking chamber 14 and outlet chamber 15, non-return valve 16 the inlet of which is connected to the inlet port 2 and the outlet of which is connected to the compression chamber 10, solenoid valve 17 installed between the control chamber 6 and the spill port 3. The HDV controls an area for the flow of liquid (for simplicity we will hereinafter refer to such areas as flow areas) from the inlet port 2 to the working chamber 9 and opens towards the working chamber. Spring 18 tends to close the HDV.

Figure 2:
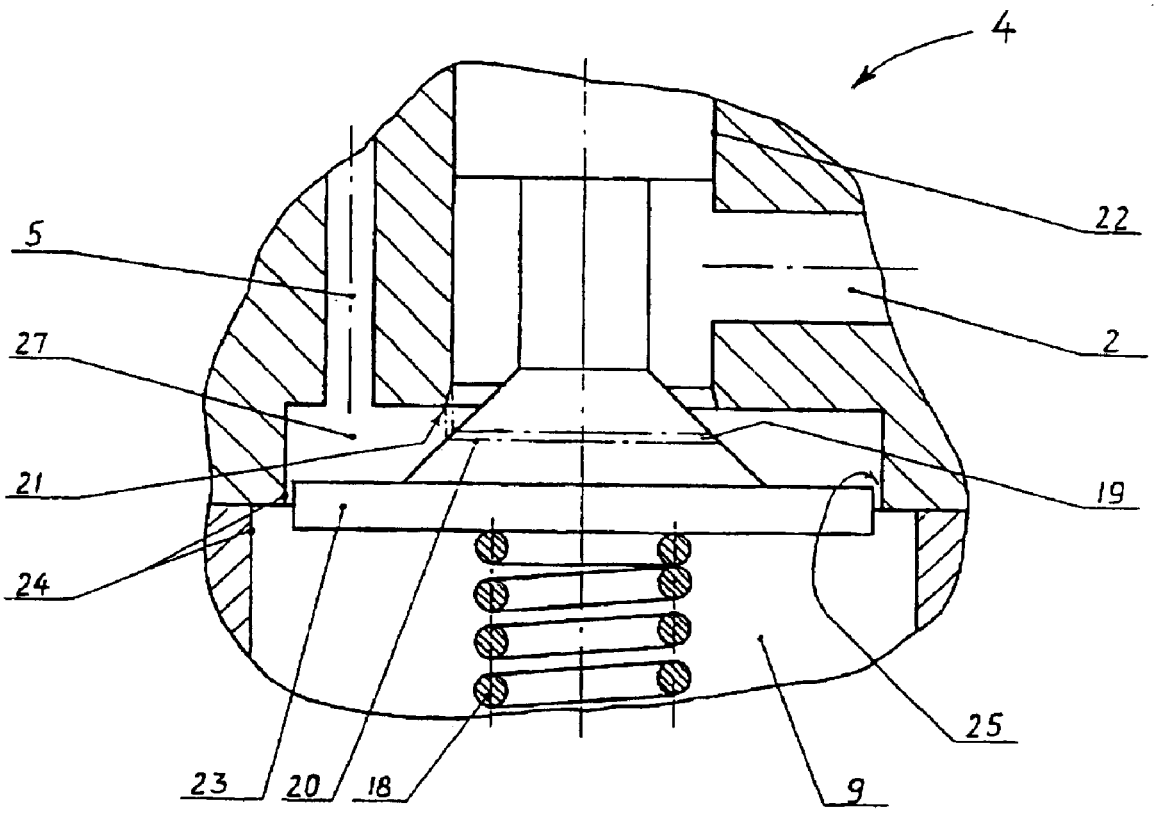
FIG. 2 is a magnified view of a section of the hydraulically controlled differential valve of the injector of FIG. 1.

Referring to FIG. 2, the HDV 4 has a differential spot 19 determined by the contact line 20 of the seating face 21 and the HDV and by the diameter of sealing cylindrical surface 22. The HDV has a poppet 23 which is located on the working chamber side with respect to the seating face 21. This poppet and the surface 24 surrounding it form the throttling slot 25, a flow area of which may vary with the movement of the HDV. There is a poppet chamber 27 comprised of poppet 23, surface 24, throttling slot 25 and a flow area between the HDV and seating face 21. Referring to FIG. 1, the poppet chamber 27 is connected to control chamber 6 via the bypass channel 5. The compression chamber 10 is connected with the outlet chamber 15. The compression chamber 10 may also be connected with the locking chamber 14 through the cut-off port 26 of the plunger 8 depending on the plunger's position.

Figure 3:
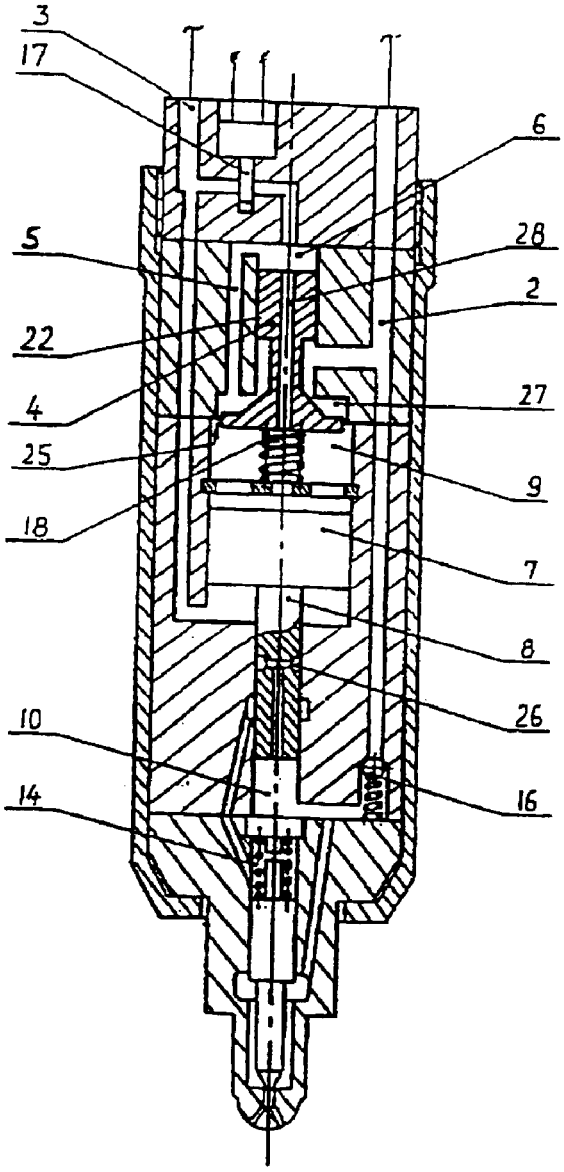
FIGS. 3–7, 9 and 10 are views similar to FIG. 1 but of different embodiments of injectors in accord with the present invention.

An alternate form of the invention is shown in FIG. 3 which is identical to that shown in FIG. 1 except that there is the hole 28 to directly connect the control chamber 6 and the working chamber 9.

Figure 4:
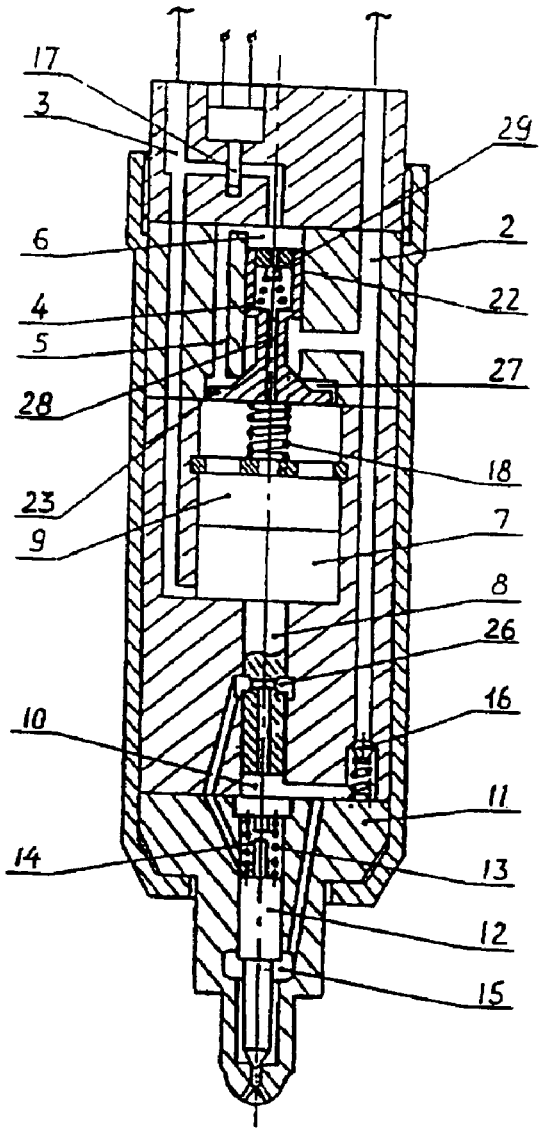

Another alternate form of the invention is shown in FIG. 4 which is identical to that shown in FIG. 3 except that the non-return valve 29 is installed in the hole or bore 28. The inlet of this non-return valve is connected to control chamber 6.

Figure 5:
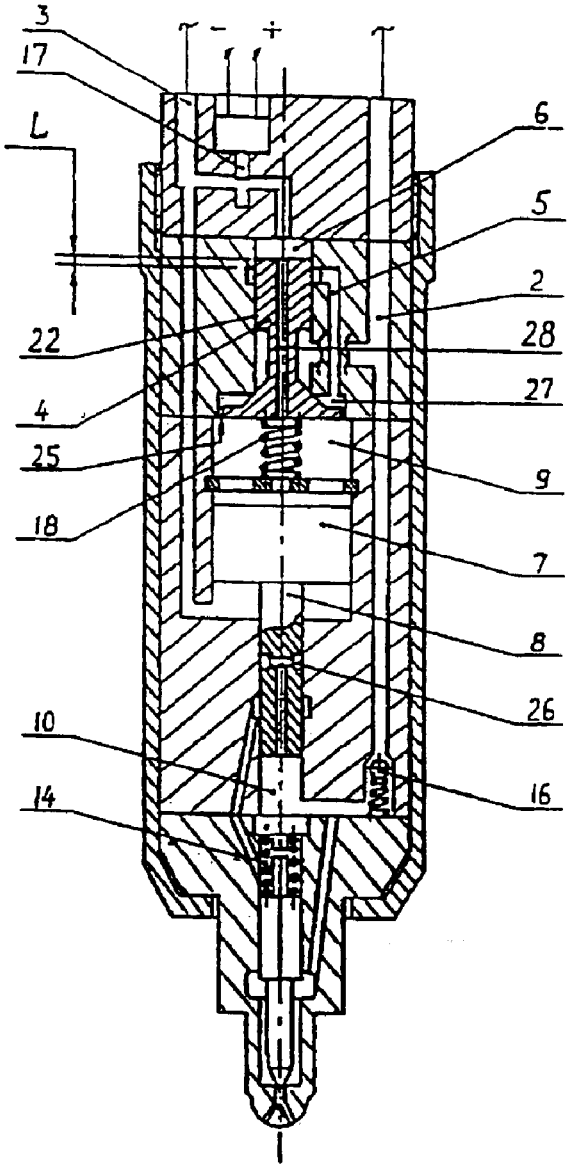

Another alternate form of invention is shown in FIG. 5 which is identical to that shown in FIG. 3 except that the sealing cylindrical surface 22 of the HDV 4 may change the flow area of the bypass channel 5 and close this channel off when moved along its axis.

Figure 6:
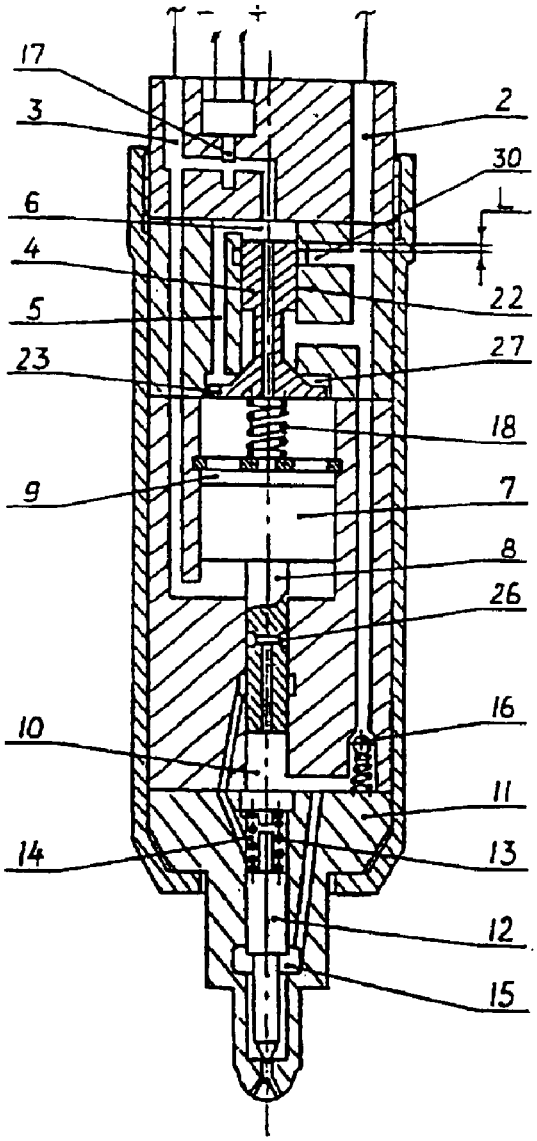

Another alternate form of the invention is shown in FIG. 6 which is identical to that shown in FIG. 1 or FIG. 3 or FIG. 4 except that the control chamber 6 is connected to the inlet port 2 via bypass channel 30 and the sealing cylindrical surface 22 of the HDV 4 may change the flow area of the bypass channel 30 and close this channel off when moved along its axis.

Figure 7:
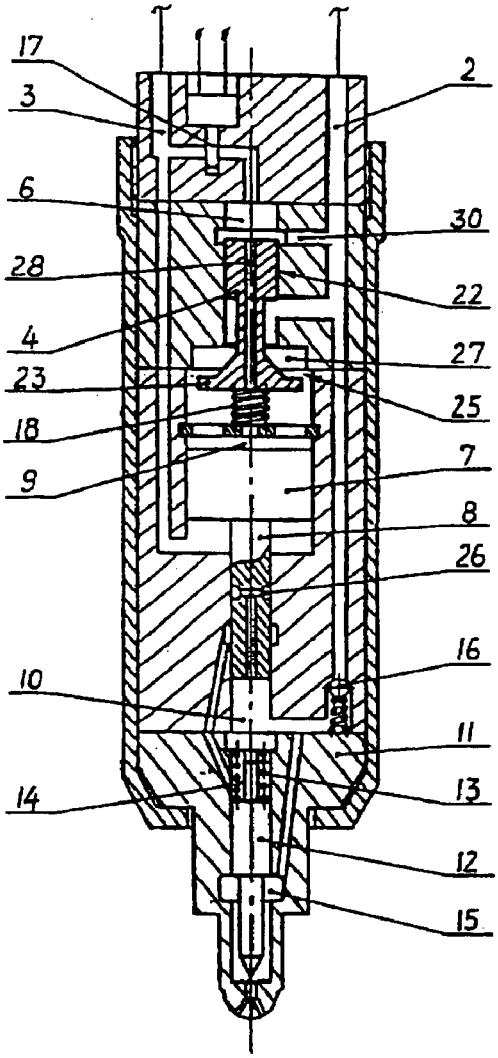

Another alternate form of the invention is shown in FIG. 7 which is identical to that shown in FIG. 3 except that a connection between the poppet chamber 27 and the control chamber 6 is absent and the control chamber 6 is connected to the inlet port 2 through the channel 30, wherein the sealing cylindrical surface 22 of the HDV 4 may change the flow area of the channel 30 and close it off when moved along its axis.

Figure 9:
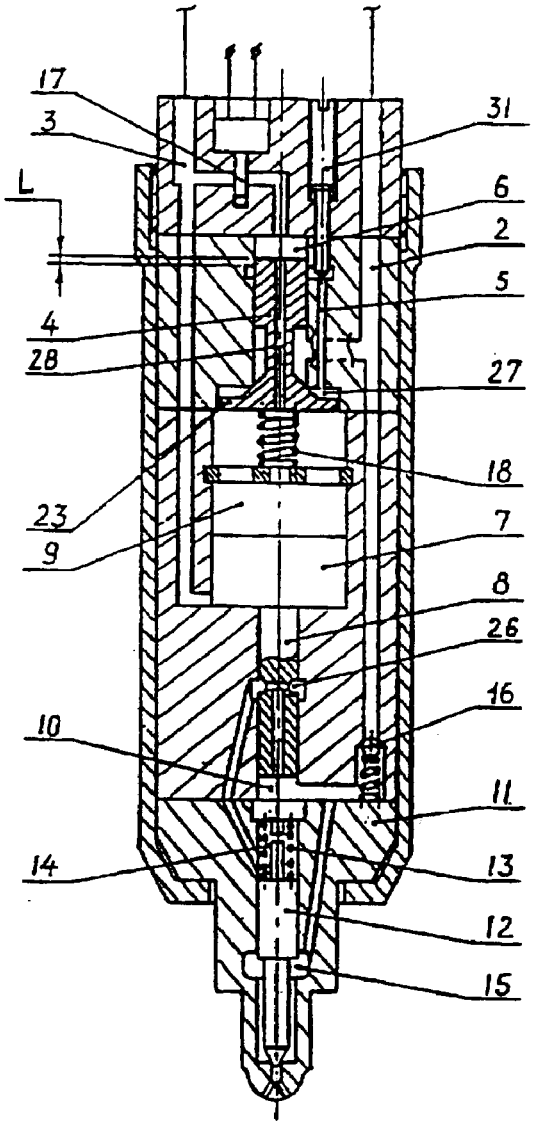

Another form of invention is shown in FIG. 9 which is similar to those shown in FIGS. 1–7 except that an additional adjustable valve 31 is installed, which is capable of varying the flow area of the bypass channel 5. Said valve 31 may also be implemented in the other forms of the invention shown in FIGS. 1,3,4,6,7 to vary the flow areas of the channel 5 or 30.

Figure 10:
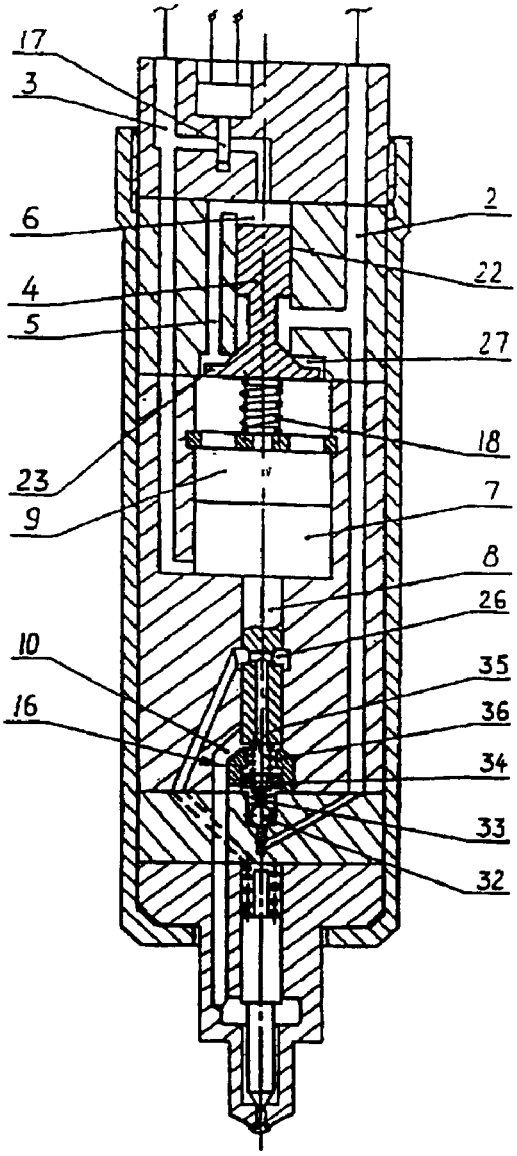

Another form of the invention is shown in FIG. 10 which is identical to the ones described before except that the flow area of the non-return valve 16 may be controlled mechanically by the pressure intensifier with the purpose of improving the reliability of the operation of the unit injector. The design and a principle of operation of this form of the invention will be described in greater details later.

Figure 11:
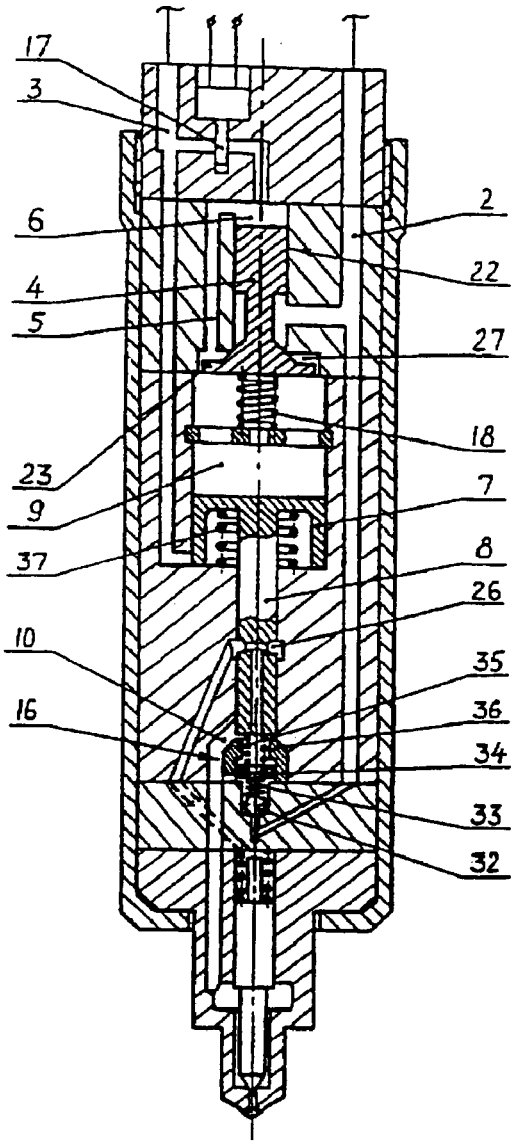
FIGS. 11 and 12 are views of another embodiment in different stages of operation.
Figure 12:
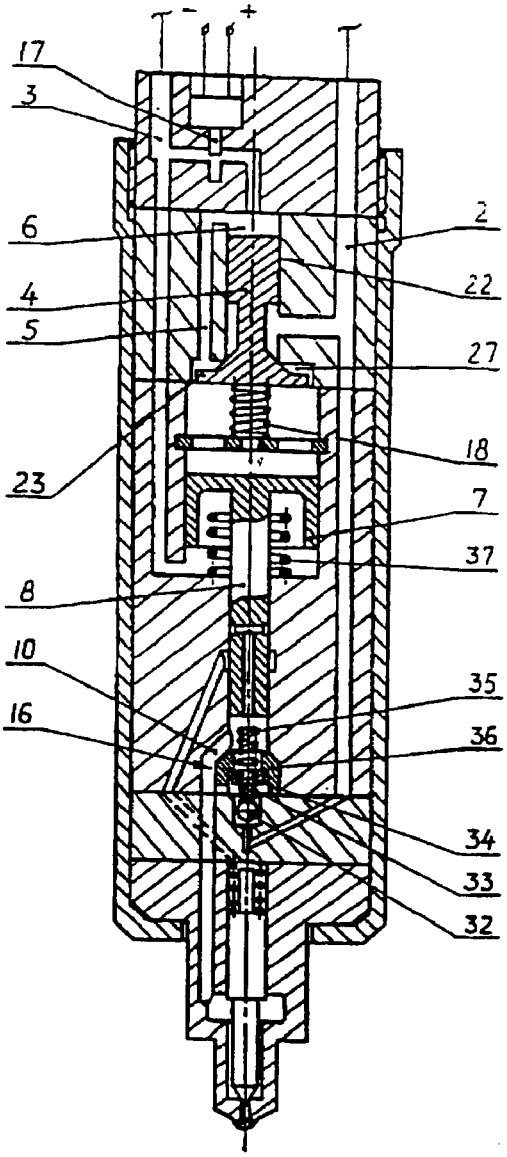
Figure 13:
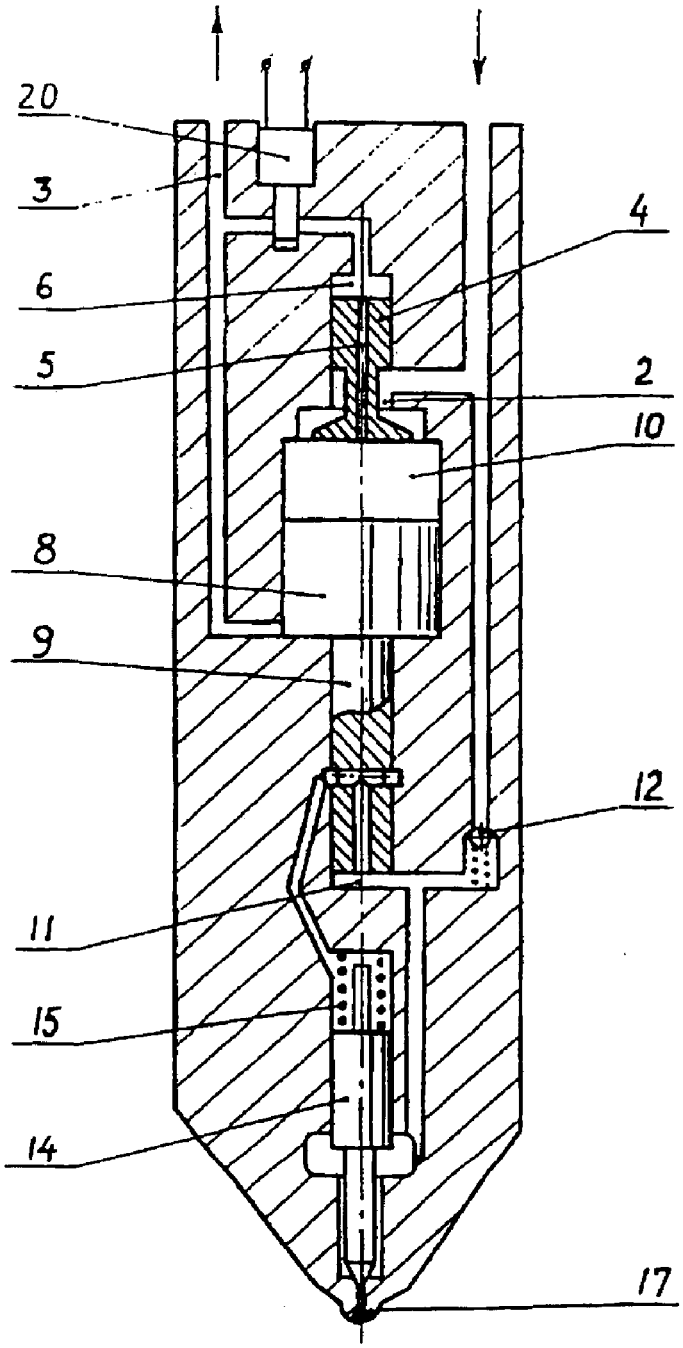
FIG. 13 is a longitudinal cross sectional view of a prior art injector of SU-A-1671938 with reference numerals coincident with those shown in that specification.

Another form of the invention is shown in FIGS. 11–12, which is similar to that shown in FIG. 10 except that a spring 37 is added.

The fuel injection system works as follows—Referring to FIG. 1, in the initial position the solenoid valve 17 is inert and closes off the connection between control chamber 6 and spill port 3. The HDV 4 is closed, the piston 7 and plunger 8 are kept in the bottom position by the fuel pressure in the working chamber 9, the locking chamber 14 is connected via the plunger's cut-off port 26 with compression chamber 10 and the nozzle 11 is closed by the needle 12.

Figure 8:
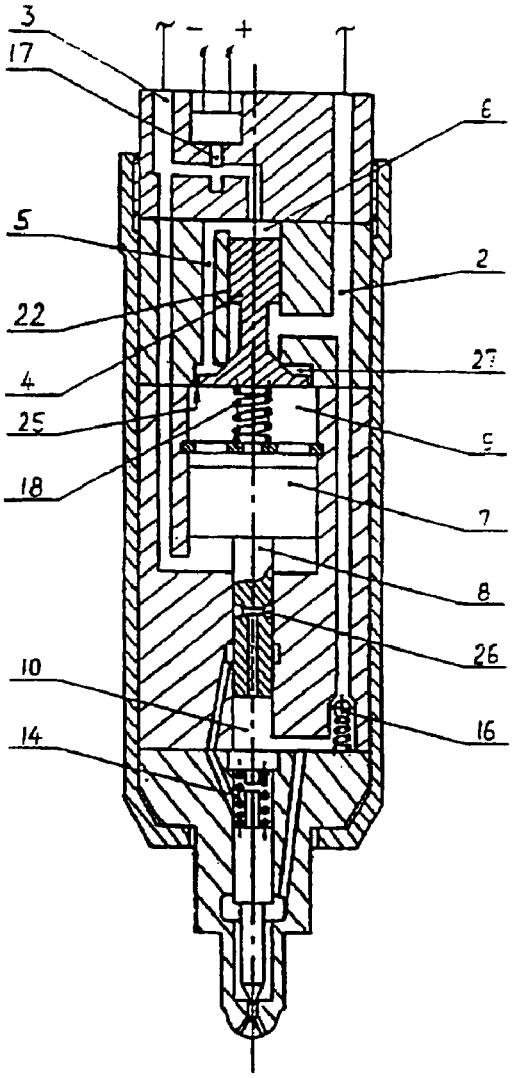

Referring to FIG. 8, when electric current is supplied to electric valve 17 it opens and allows the fuel to flow from the working chamber 9 through the throttling slot 25 to poppet chamber 27, further through the bypass channel 5 to control chamber 6 and out through the spill port 3. The flow area of the throttling slot 25 is such that said flow through it causes the hydraulic force to act on the HDV in the direction of the flow which holds the HDV closed with the additional assistance of the force exerted by the spring 18. When pressure in the working chamber 9 has decreased to a certain level piston 7 and plunger 8 move up under the pressure in the compression chamber 10, the fuel pressure being transmitted through the non-return valve 16. At a certain point in the travel of the plunger its cut-off port 26 closes the connection between compression chamber 10 and locking chamber 14 and whilst at or beyond that point it isolates the chambers 10 and 14 from each other. The period of time during which piston 7 and plunger 8 move up is determined by the duration of opening of the solenoid valve 17 which is in turn determined by the duration of the current supplied by the engine management system (not shown). When piston 7 and plunger 8 have reached the required position which is determined by the fuel delivery required at that instant, the current is switched off by the engine management system and the electric valve closes thereby isolating the control chamber 6 and spill port 3. As a result, the fuel flow via the throttling slot 25 stops and the hydraulic force holding HDV 4 closed ceases to act. The pressure in the fuel transmitted through inlet port 2 and to the differential spot in the HDV overcomes the force of spring 18 and provides an initial opening of the HDV (Ref. FIG. 3). This allows fuel to flow through the inlet port 2 to the poppet chamber 27 and via the throttling slot 25 to the working chamber 9 and via the bypass channel 5 to control chamber 6. The pressure in the working chamber 9 rises and causes the piston 7 and the plunger 8 to move down thereby compressing the fuel in the compression chamber 10 and closing the non-return valve 16.

Referring to FIG. 2, the poppet 23 and the surface 24 surrounding it are designed in such a way that the flow area of the throttling slot 25 may be less (typically up to 99% less) than the flow area between the HDV 4 and the seating face 21 while the HDV 4 is located between its closed position and a certain position between its closed and fully open positions (further down we will define the state of the HDV when it is located between the closed and said certain positions as the initial travel of the HDV). Therefore during the initial travel of the HDV (Ref. FIG. 3) the pressures in the poppet chamber 27 and control chamber 6 may be kept higher than the pressure in the working chamber 9. The pressures in the control 6 and poppet 27 chambers act on the HDV 4 and its poppet 23 respectively and help the HDV to open (i.e. to increase the flow area between the HDV and seating face 21) at a faster rate. Said initial travel of the HDV may typically take up to 80% of the full stroke of the HDV. In the preferred embodiment, as shown in FIG. 2, the throttling slot 25 is formed by the clearance between the poppet 23 and the surface 24, said clearance remains constant during the initial travel of the HDV. On the final part of the opening stroke of the HDV the flow area of the throttling slot 25 increases (Refer FIG. 7), in order to decrease hydraulic resistance to the fuel flow. In the preferred embodiment, when the HDV is fully open the resistance to the flow through the throttling slot 25 has decreased to the value such that it provides the hydraulic force which is equal to the force exerted by the spring 18 but opposite in its direction.

As the fuel pressure in compression chamber 10 increases, the pressure in the nozzle's outlet chamber 15 also increases and opens the nozzle, overcoming the force of spring 13 and pressure in the locking chamber 14 and lifting needle 12 off its seat. During an injection stroke of the piston 7 and plunger 8 fuel is injected through opened nozzle 11. When the plunger 8 reaches the position where it opens its cut-off port 26 the pressures in compression chamber 10 and locking chamber 14 equalise and the needle 12 closes nozzle 11 and the piston 7 and plunger 8 stay at the bottom of the stroke. When the piston is stationary there is no fuel flow through the HDV and the pressures in the working chamber 9, poppet chamber 27 and control chamber 6 equalise with the pressure in the inlet port 2 and the spring 18 moves the HDV up and closes it. Thus the system returns to the initial position as shown in FIG. 1.

In an alternate form of the invention (Ref. FIG. 3) the fuel injection system works in the same way. The total flow area of the throttling slot 25 and the hole 28 is chosen such that it provides sufficient resistance to the fuel flow from the working 9 to control 6 chambers to hold the HDV closed with the open solenoid valve 17.

In an alternate form of the invention shown in FIG. 4 the fuel injection system works in the same way. When the piston and plunger stop at the end of the injection stroke and pressures in the inlet port 2 and working chamber 9 equalise, the spring 18 closes HDV 4. During its movement to the closed position the positive pressure difference between the control chamber 6 and working chamber 9, developed by the spring 18, opens non-return valve 29. By this means the total flow area of the path, connecting the working chamber 9 with the control 6 and poppet 27 chambers, may be increased at the time when the HDV 4 is being closed, therefore the time required to close the HDV, is reduced.

In another alternate form of invention shown in FIG. 5, with the HDV 4 in the closed position the bypass channel 5 is closed by the sealing cylindrical surface 22 of the HDV and there is an overlap "L". The fuel injection system works in the same way as the one shown in FIG. 1, but when the solenoid valve 17 is open and fuel flows from the working 9 to control 6 chambers, the flow rate does not depend on the flow area of throttling slot 25, therefore the fuel delivery of the injection system is less affected by the tolerances on the dimensions of the throttling slot 25.

In another form of the invention shown in FIG. 6 the fuel injection system works in the same way as the one shown in FIG. 1 or FIG. 3 or FIG. 4 with the open solenoid valve 17. Also similarly, after the electric valve has closed, the hydraulic forces act on the HDV and opens it. At the certain position of the HDV its sealing cylindrical surface 22 opens the bypass channel 30. By this means the pressure in the control chamber 6 during the opening stroke of the HDV is increased, therefore the HDV opens at a faster rate.

In another form of the invention shown in FIG. 7 the fuel injection system works in the same way as the one shown in FIG. 5. Also similarly, when the solenoid valve 17 closes the hydraulic forces acting on the differential spot 19 and the poppet 23 open the HDV. At a certain position of the HDV its sealing cylindrical surface 22 opens the bypass channel 30. By this means the pressure in the control chamber 6 during the opening stroke of the HDV is increased, therefore the HDV opens at a faster rate.

In another form of the invention shown in FIG. 9 the fuel injection system works in the same way as the ones described before. The flow area of the bypass channel 5 may be varied with the additional adjustable valve 31. By this means a pressure in the control chamber 6 during an opening stroke of the HDV 4 may be controlled, therefore the speed of the opening stroke of the HDV may be controlled.

In another form of the invention shown in FIG. 10 the fuel injection system works in the same way as the ones described before but the flow area of the non-return valve 16 is controlled by the pressure intensifier such that when the fuel injection system is in its initial position the non-return valve is closely mechanically by the plunger 8. The non-return valve 16 in one embodiment comprises a locking element in the form of a ball 32, a return spring 33, a spacer 34 with a connection spring 35 attached to said spacer, and a stopper 36. When the pressure intensifier is in its initial position, the plunger 8 compresses the connection spring 35 such that said spring exerts the force through the spacer 34 on the ball 32 which is greater than the hydraulic force acting on said ball from the pressure in the inlet port 2, therefore the non-return valve is in a closed state. When the solenoid valve 17 opens and the pressure in the working chamber 9 decreases, as described above, the plunger 8 starts to move up under the force of the connection spring 35 and an hydraulic force of the pressurized fuel trapped in the compression chamber 10 after the previous injection cycle. During this upward movement of the plunger it releases the connection spring 35 and when the pressure in the compression chamber 10 falls below the pressure in the inlet port 2 the non-return valve 16 opens under the pressure in the inlet port 2, as shown in FIG. 12. An additional return spring 37 may be installed under the piston 7, as shown in FIGS. 11 and 12, to assist the initial upward movement of the plunger 8. As long as said spring 37 is required only for initial upward movement of the plunger 8 and it is not necessary to maintain a contact between said spring 37 and the piston 8 during all upward travel of the intensifier, it can be of a shortened free length as shown in FIG. 12 in order to save the dimensions.

There is another element to this invention as follows—Direct injected diesel engines are more efficient than indirect injected types, but direct injected diesel engines suffer from a relatively high noise level at low speed and load and particularly at idle. The main source of that noise is a rapid increase in pressure within the cylinder as a result of a prolonged delay before ignition of the injected fuel occurs. The prolonged ignition delay results in a considerable amount of fuel having been injected and prepared for ignition (mixed with air, vaporised, heated) prior to ignition so that when ignition occurs the amount of heat released, and therefore the increase of the pressure within the cylinder, in relation to the crank angle is high. One of the reasons for the increased ignition delay at low speed and load is the relatively low temperature of the combustion chamber at those conditions so that the process of the heating of the fuel to a specific temperature takes a longer time.

One basic method to eliminate this phenomenon is to structure the process of fuel injection so that the rate of increase of injection pressure (therefore the rate of actual fuel injection) at the beginning of the process is reduced and this is done by causing the leading front of the injection pressure curve to have something of a "stepped" shape. A small part of the fuel to be injected is injected at the beginning of the injection cycle over a relatively long period of time with the purpose of providing an ignition of this pilot fuel portion thereby ensuring that the rest of the fuel injected on that cycle is injected into media with a higher temperature and this results in a reduced rate of heat release.

At higher speeds and also high engine loads it is necessary to provide very short duration of injection process to achieve proper heat utilisation and low emission of pollutants and this requires a higher rate of increase of fuel injection pressure. This is particularly important for turbo-charged diesel engines featuring high boost levels and with large bore sizes because the high injection pressure developed during the ignition delay allows the fuel spray to permeate the whole combustion chamber before the media in it is compressed significantly by the burning fuel. It is desirable that a variable range of fuel injection pressures should be provided to allow for this condition and bring about complete utilisation of the charge air.

According to the described method, if a low noise level, high efficiency and low emission of pollutants of the diesel engine are to be achieved under the various operating regimes, it is necessary that the fuel injection system should be able to control the shape of the injection pressure curve over a wide range and with the engine running. It is likely that the design of a fuel injection system with the necessary abilities and flexibility will have an unacceptably high cost, complexity and low reliability.

This invention presents a new method of reducing the noise level emanated from the combustion process of the diesel engine at acceptable cost and reliability. According to this new method, a pilot amount of fuel is injected into the cylinder well before the top dead centre of the compression stroke. Typically it can be injected any time from the moment of the exhaust valve's closure to this TDC, as long as enough time has been left for the fuel injection system to get prepared for the main injection which delivers the main part of the total amount of fuel required at given operating conditions of the diesel engine. Therefore this method allows for control of the noise emission from the diesel engine by means of control of injection timing and fuel delivery only and does not require the fuel injection system to have the ability to control the shape of the injection pressure curve.

It is necessary that the quantity of fuel of the pilot injections be very small to avoid inferior performance from the engine. The design of the fuel injection system described herein provides great flexibility and very wide ranges of control of injection timing and fuel delivery and is capable of injecting small enough amounts of pilot fuel to make it possible to implement a new method of reducing the engine's noise by controlling the amount of fuel and injection timing for both pilot and main injections independently of each other.

The advantages of the present invention over known fuel injection systems are achieved mainly by the following means:

- the application of the spring 18;
- the application of the throttling slot 25 designed in such a way that during the initial travel of the HDV the flow area of this slot may be less than the flow area between the HDV and the seating face 21;
- the application of the bypass channel 5 connecting the poppet chamber 27 to control chamber 6;
- the application of the additional adjustable valve 31;
- the application of the non-return valve 16 as shown in FIGS. 10–12, the flow area of which may be controlled by the pressure intensifier.

In the absence of spring 18 the HDV may be closed by the positive pressure difference between the working 9 and control 6 chambers caused by the flow from the working chamber through the control chamber and open electric valve to the spill port 3. Such as HEUI is shown in SU Patent no. 1,671,938 WPI Acc No. 92-347048/42. In that case during the process of closing the HDV fuel flows through semi-opened HDV from the inlet port 2 to the working chamber 9 and further to the spill port 3. The application of the spring 18 eliminates this waste of hydraulic energy because said spring closes the HDV 4 with the solenoid valve 17 closed, as described above. Also, the application of the spring 18 provides a better stability of fuel delivery in consecutive injections, especially with small fuel deliveries. In the case of a design without a spring 18 the HDV is being closed during the period when electric current is turned on. As the durations of the closures of the HDV differ from cycle to cycle due to, for example, random changes in the force of friction in the sealing cylindrical surface 22 of the HDV, the parts of the full electric impulses which remain to execute the reverse (filling) stroke of the plunger and piston are different, which causes corresponding variations in fuel deliveries. As long as the spring 18 in the present invention closes the HDV before the electric current is turned on, the reverse (filling) stroke of the plunger and piston are always determined by the full duration of the electric impulse supplied by an engine management system without any random variation. This ensures better stability of fuel delivery in consecutive injections.

The application of the throttling slot 25, the flow area of which may be less than the flow area between the HDV 4 and seating face 21, allows higher pressure to build in the poppet chamber 27 during the opening of the HDV, which forces it to open at a faster rate. The application of the bypass channels 5, 30 allows higher pressure to build in the control chamber 6 during this period and also increases the opening rate of the HDV. Faster opening of the HDV decreases its overall hydraulic resistance during the period of the injection, and therefore increases the injection pressure.

The application of the additional adjustable valve 31 as shown in FIG. 9 allows for control of a speed of the opening stroke of the HDV 4. By this means it is possible to control the shape of an injection pressure curve of the unit injector during its operation. This can help to increase the efficiency of research work on diesel engines.

The application of the non-return valve 16 (Ref. FIGS. 10–12), the flow area of which may be controlled by the pressure intensifier, improves reliability of the unit injector. In case of insufficient sealing between the tapered end of the needle 12 and the nozzle 11, the non-return valve 16 which is closed by the plunger 8 prevents a flow of fuel from the inlet port 2 to the cylinder of an engine. Otherwise such flow of fuel can cause significant waste of fuel, smoke emission, contamination of the engine's oil and even a failure of the engine.

Poor sealing in the nozzle leads to a significant increase in the emission of pollutants of the exhaust gases of a diesel engine in any case. A method of avoiding such increase in pollution where poor nozzle sealing occurs will now be described.

The method according to present invention is based on the ability of the injection system to provide an additional means for closing the fuel flow path from the inlet port to the cylinder of an engine. When poor nozzle sealing occurs in one of the cylinders of the diesel engine during its operation, an engine management system detects it and stops the supply of control impulses to the failed unit injector. Then the pressure intensifier of this unit injector is kept in the bottom position by the fuel pressure in the working chamber at all times, thereby closing the non-return valve 16 according to FIGS. 10–12 and preventing fuel in the inlet port 2 from entering the compression chamber 10 and the engine's cylinder. By this means a vehicle is allowed to reach a service station with this cylinder not working but without extensive damage to the environment.

In order to enable the engine management system to detect the cylinder which is causing excessive pollution a sensor of the temperature of the exhaust gases can be used, because a fuel leakage from the faulty nozzle will cause not only an increased emission of smoke, but also an increase in the exhaust temperature. If only one temperature sensor is used in the common exhaust pipe, the engine management system can be programmed to find the faulty cylinder by shutting down each cylinder in turn and measuring exhaust temperatures on each of these steps.

It will be appreciated by persons skilled in the art that numerous variations and/or modifications may be made to the invention as shown in the specific embodiments without department from the spirit or scope of the invention as broadly described. The present embodiments are, therefore, to be considered in all respects as illustrative and not restrictive.

We claim:

1. A fuel injector system for an internal combustion engine said injector system comprising an inlet port; a spill port; a pressure intensifier comprised of a piston forming a working chamber and a plunger forming a compression chamber; a nozzle with a needle, a spring biasing the needle to close the nozzle, and an outlet chamber connected to the compression chamber; a non-return valve the inlet of the non-return valve being connected to the inlet port and the outlet of the non-return valve being connected to the compression chamber; an hydraulically controlled differential valve (HDV) having a seating face located between the inlet port and the working chamber, said HDV forming a control chamber and the HDV opens towards the working chamber, said HDV using a poppet opening into the working chamber upon release from the seating face, said poppet forming a fluid flow throttling slot and a poppet chamber, wherein a flow area of the throttling slot is up to 99% less than the flow area between the HDV and the seating face during a part of the travel of the HDV, said part of the travel being up to 80% of full travel of the HDV, further wherein said poppet chamber is connected to the control chamber via a bypass channel; resilient means for biasing the HDV towards its closed position; a solenoid valve installed between the control chamber and the spill port.

2. A fuel injector system for an internal combustion engine said injector system comprising an inlet port; a spill port; a pressure intensifier comprised of a piston forming a working chamber and a plunger forming a compression chamber; a nozzle with a needle, a spring biasing the needle to close the nozzle, and an outlet chamber connected to the compression chamber; a non-return valve the inlet of the non-return valve being connected to the inlet port and the outlet of the non-return valve being connected to the compression chamber; an hydraulically controlled differential valve (HDV) having a seating face located between the inlet port and the working chamber, said HDV forming a control chamber and the HDV opens towards the working chamber, said HDV using a poppet opening into the working chamber upon release from the seating face, said poppet forming a fluid flow throttling slot and a poppet chamber, wherein a flow area of the throttling slot is up to 99% less than the flow area between the HDV and the seating face during a part of the travel of the HDV, said part of the travel being up to 80% of full travel of the HDV, further wherein said working chamber is connected to the control chamber via a bore; resilient means for biasing the HDV towards its closed position; a solenoid valve installed between the control chamber and the spill port.

3. A fuel injector according to claim 1, wherein the flow area of the throttling slot remains constant during the part of the travel of the HDV.

4. A fuel injector according to claim 1 wherein the working chamber is connected to the control chamber via a bore.

5. A fuel injector according to claim 2, wherein a further non-return valve is installed in the bore, the inlet of said further non-return valve being connected to the control chamber.

6. A fuel injector according to claim 4 wherein a sealing cylindrical surface of the HDV is adapted to change the flow area of the bypass channel and close off the bypass channel depending on the axial position of the HDV.

7. A fuel injector according to claim 1 wherein the control chamber is connected to the inlet port via a channel and a sealing cylindrical surface of the HDV is adapted to vary the flow area of the channel and close off a channel in dependence on the axial position of the HDV.

8. A fuel injector according to claim 4 wherein the connection between the poppet chamber and control chamber is closed and the control chamber is connected to the inlet port with a channel and the sealing cylindrical surface of the HDV varying the flow area of the channel and adapted to close off the channel depending on the axial position of the HDV.

9. A fuel injector according to claim 1 wherein the non-return valve is adapted to be mechanically closed by a pressure intensifier.

10. A fuel injector according to claim 9 wherein resilient means is placed between the plunger and a locking element of the non-return valve such that when the pressure intensifier is in the bottom position the plunger closes the non-return valve transmitting a force required to close said valve through the resilient means.

11. A method of improving the reliability of a diesel engine equipped with a fuel injector [wherein] *such that when there is* an incomplete closing of a [fluid] *fuel* injection nozzle in one of the engine's cylinders [causes] an engine management system [to stop] *stops* supplying the injector of said one cylinder with electric control impulses, [whereby] *and wherein* a pressure intensifier in the fuel injector permanently closes off [the] *a* non-return valve, *to* thereby [preventing] *prevent* access of pressurised fuel to the [unsealed] *incompletely closed* nozzle[, which otherwise will cause significant increase in smoke emission and exhaust gas temperature of the engine or its breakdown].

12. A fuel injector according to claim 7 comprising an additional adjustable valve adapted to vary the flow area of the bypass channel or the channel.

13. A fuel injector according to claim 8 comprising an additional adjustable valve adapted to vary the flow area of the bypass channel or the channel.

14. A fuel injector according to claim 9 wherein additional resilient means is placed beneath the piston to exert a force on the piston in the direction of upward movement of the piston.

15. A fuel injector according to claim 10 wherein additional resilient means is placed beneath the piston to exert a force on the piston in the direction of upward movement of the piston.

*16. A fuel injector according to claim 2, wherein the flow area of the throttling slot remains constant during the part of the travel of the HDV.*

*17. A fuel injector according to claim 2, wherein the control chamber is connected to the inlet port via a channel and a sealing cylindrical surface of the HDV is adapted to vary the flow area of the channel and close off a channel in dependence on the axial position of the HDV.*

*18. A fuel injector according to claim 2, wherein the non-return valve is adapted to be mechanically closed by a pressure intensifier.*

* * * * *